United States Patent
Lopez et al.

(10) Patent No.: US 7,274,664 B2
(45) Date of Patent: Sep. 25, 2007

(54) MULTI-CHANNEL COMMUNICATION SYSTEM AND METHOD BASED ON CLASS OF SERVICE REQUIREMENTS

(75) Inventors: Ricardo Jorge Lopez, San Marcos, CA (US); Richard D. Lane, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/064,563

(22) Filed: Feb. 23, 2005

(65) Prior Publication Data

US 2005/0157693 A1 Jul. 21, 2005

Related U.S. Application Data

(63) Continuation of application No. 10/283,990, filed on Oct. 29, 2002.

(51) Int. Cl.
*H04L 12/28* (2006.01)
*H04L 12/66* (2006.01)
*H04J 3/16* (2006.01)

(52) U.S. Cl. ............... 370/230; 370/235; 370/356; 370/395.21; 370/468; 370/474

(58) Field of Classification Search ............ None
See application file for complete search history.

(56) References Cited

U.S. PATENT DOCUMENTS

| | | | | |
|---|---|---|---|---|
| 5,828,843 A | * | 10/1998 | Grimm et al. | 709/228 |
| 5,991,302 A | * | 11/1999 | Berl et al. | 370/400 |
| 6,304,902 B1 | * | 10/2001 | Black et al. | 709/223 |
| 6,426,960 B2 | | 7/2002 | Antonio | |
| 6,475,090 B2 | * | 11/2002 | Roelofs | 463/42 |
| 6,496,851 B1 | * | 12/2002 | Morris et al. | 709/204 |
| 6,676,521 B1 | * | 1/2004 | La Mura et al. | 463/42 |

* cited by examiner

*Primary Examiner*—Chi Pham
*Assistant Examiner*—Melanie Jagannathan
(74) *Attorney, Agent, or Firm*—Thomas Rouse; Timothy F. Loomis; Timothy E. Buckley

(57) ABSTRACT

A communication transaction or use case is broken down into constituent parts having different class of service (COS) requirements. The parts are matched to different links or channels having respective COS characteristics and communicated over the links or channels, and then aggregated at the receiver.

51 Claims, 1 Drawing Sheet

MULTI-CHANNEL COMMUNICATION SYSTEM AND METHOD BASED ON CLASS OF SERVICE REQUIREMENTS

The present Application for Patent is a continuation of patent application Ser. No. 10/283,990 entitled "MULTI-CHANNEL COMMUNICATION SYSTEM AND METHOD BASED ON CLASS OF SERVICE REQUIREMENTS" filed Oct. 29,2002, pending, and assigned to the assignee hereof and hereby expressly incorporated by reference herein.

FIELD OF THE INVENTION

The present invention relates generally to computer-based communication systems.

BACKGROUND OF THE INVENTION

Nodes such as server platforms, client stations, peer stations, and intermediate station nodes in current communication systems typically must select a single channel or single link or other communication interface incident to undertaking a data transfer transaction or a so-called "use case" (essentially, one or more transactions or constituent use cases directed to a common goal), such as the wireless transmission of multimedia data or the downloading of a Web page. This is so even though the nodes themselves might be capable of communicating over a number of diverse channels or links.

The goal—the use case—is the downloading of the page. But it entails around seventy hypertext transfer protocol (HTTP) transactions, each of which might in turn entail one or more TCP transactions. The various parts of the use case—in this case, the various HTTP and TCP transactions—might have various class of service (COS) requirements, e.g., different latency requirements and/or different bandwidth requirements and/or different error quality requirements, to name three COS variables, yet only a single communication link will be chosen for the entire use case.

From the above discussion, it can be appreciated that the selection of the channel or link might be independent of the COS requirements of the transaction or use case to be fulfilled. For instance, as mentioned above a client station typically selects a statically configured link for all communications with the Internet that is independent of any particular transaction or use case that is to be fulfilled. The particular selection might be based only on a desire to obtain the channel that has a COS which provides a highest overall communication quality without regard to actual needs for a particular transaction, or to obtain the lowest cost channel without regard to actual quality needs for a particular transaction. In any case, this "one size fits all" circumstance is based in part on the desire to avoid the complexity that would attend layering communication protocols together, a technique that has been used for making a link (such as a satellite link) perform better than it otherwise would.

The present invention recognizes that not only do different transactions/use cases have different COS requirements, but different portions of a single transaction/use case might have differing COS requirements. To continue with the above Web page use case example in a bit more detail, the user computer ordinarily has a low latency COS demand for HTTP transactions related to establishing a connection with a server, but, once connected, subsequent HTTP transactions might have high-bandwidth, latency insensitive COS as data (such as multimedia data) is communicated from the server to the user. As recognized by the present invention, using just one channel having a single set of COS characteristics for both portions of the use case results in inefficiencies in the use of the communication capabilities of clients, servers, and other nodes in modern communication systems.

SUMMARY OF THE INVENTION

A communication system includes a first node and a second node communicating with the first node pursuant to a single use case. The use case, defined as one or more transactions directed at a common goal, has at least first and second portions that are characterized by respective class of service (COS) requirements. The nodes communicate with each other using respective first and second channels for the first and second portions. According to present principles, the channels are established based on the COS requirements.

In preferred embodiments, each node aggregates received portions. As disclosed further below, the channels may be bidirectional.

In a non-limiting exemplary implementation, the first node is an online game server and the second node is a client station. In this implementation, the first channel is a satellite link and the second channel is a terrestrial link. The terrestrial link is used to communicate TCP acknowledgements and client-originated game choices, and the satellite link is used to communicate game world state changes from the server to the client station.

In another non-limiting implementation, the use case has first, second, and third portions communicated over respective first, second, and third channels. In this implementation, the second node is a mobile communication device, the first channel is a point-to-point wireless communication link, the second channel is a 802.11 link, and the third channel is a VHF, UHF, or even SHF or EHF wireless broadcast link. Service between the first node and the wireless communication device is initiated over the wireless point-to-point link or the 802.11 link, whereas multimedia data is communicated from the first node pursuant to the service over the V/UHF broadcast link. Also, audio data originating from a user of the wireless communication device can be communicated to the first node using the wireless point-to-point link, and TCP transactions can be communicated using the 802.11 link.

In still another non-limiting implementation, the first node can be a satellite, the first channel can be a satellite link, and the second channel can a terrestrial link. In a specific implementation, the satellite link can be at least one of: an L, S, or C band LEO link or a Ku, K, or Ka band LEO/MEO/GEO link, and the terrestrial link can be a 1×Ev-DO link, or a 1×link, 3×link, 1×Ev-DV link, or 802.16 (sometimes called "wireless cable") link. In any case, the first portion of the use case is a base layer of a multimedia stream that is communicated over the satellite link, and the second portion is at least one enhancement layer of the multimedia stream that is communicated over the terrestrial link. While the enhancement layer generally is less important than the base layer, a more general way to regard an enhancement layer is that it is a partition of a stream of bits that depend on other partitions for their correct interpretation and/or recognition.

In another aspect, a method is disclosed for communication during a single use case between a first communication system node and second communication system node. The use case has at least first and second parts characterized by respective first and second communication service requirements. The method includes establishing a first channel based on the first service requirement, establishing a second channel based on the second service requirement, and using the first and second channels for communication between the nodes.

In still another aspect, a client station is capable of communicating over at least two communication links, each with a respective COS, for communicating with a first node using both links incident to a single use case. The client station includes a processor that assigns at least first and second parts of the use case to the first and second links based on the respective COS.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
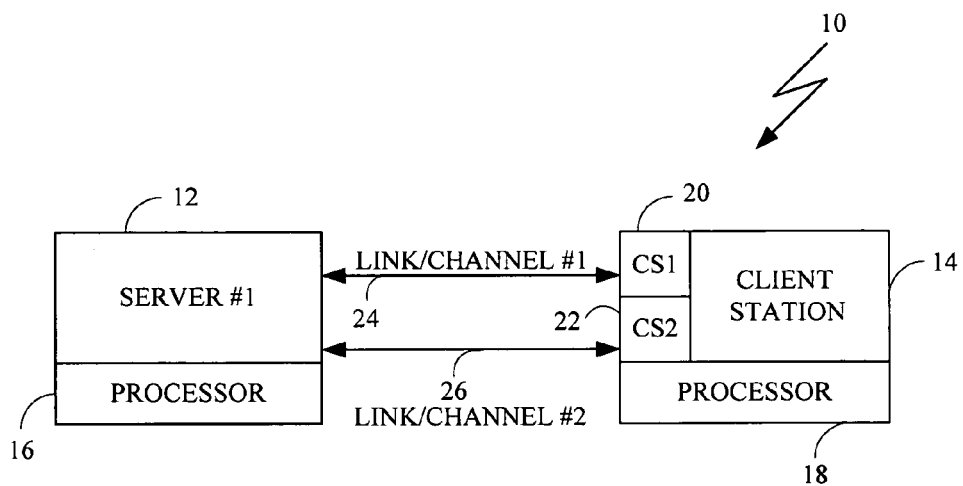
FIG. 1 is a block diagram of a simplified system.

Referring initially to FIG. 1, a system is shown, generally designated 10, that includes plural nodes, such as a server 12 and a client station 14, although the nodes can be peers in the system 10. The server 12 has a processor 16 and the client station 14 has a processor 18 for undertaking the communication logic disclosed herein.

Also, as shown the client station 14 includes at least first and second communication systems 20, 22 for communicating with the server 12 over respective first and second channels or links 24, 26. That is, the communication systems 20, 22 are configured for communicating over the respective links 24, 26. Thus, if the link 24 is a satellite link, the communication system 20 is a satellite communication system. On the other hand, if the link 26 is a wireless point-to-point link, the communication system 22 is a wireless point-to-point system such as CDMA or GSM. The client station 14 can include additional or different communication systems, such as a 802.11 communication system.

The channels or links 24, 26 have different class of service (COS) characteristics. For example, the first link 24 can have a higher or lower bandwidth than the second link 26, and/or more or less latency, and/or greater or lesser error quality characteristics, and/or other different COS variables. Non-limiting examples of the types of links or channels to which the invention applies includes wireless communication point-to-point links, UHF/VHF/SHF/EHF broadcast links, landline broadcast links, infrared (IR) links, ethernet links, 802.11 type links, satellite links, etc. In any case, as set forth further below, the present invention executes a single use case, defined to be one or more transactions, by partitioning the use case into at least first and second parts each of which has its own COS requirements, matching the parts with the links 24, 26 based on the COS requirements of the parts and COS capabilities of the links, and transmitting the parts over their respective matched links.

In one non-limiting embodiment, the client station 14 can be a "mobile station ("MS")", such as a mobile telephone-type device made by Kyocera, Samsung, or other manufacturer that uses Code Division Multiple Access (CDMA) principles and CDMA over-the-air (OTA) communication air interface protocols such as defined in but not limited to IS-95A, IS-95B, WCDMA, IS-2000, and others to communicate with wireless infrastructure, although the present invention applies to GSM, Personal Communications Service (PCS) and cellular systems, such as Advanced Mobile Phone System (AMPS) and the following digital systems: CDMA, Time Division Multiple Access (TDMA), and hybrid systems that use both TDMA and CDMA technologies. A CDMA cellular system is described in the Telecommunications Industry Association/Electronic Industries Association (TIA/EIA) Standard IS-95. Combined AMPS and CDMA systems are described in TIA/EIA Standard IS-95. Other communications systems are described in the International Mobile Telecommunications System 2000/Universal Mobile Telecommunications Systems (IMT-2000/UM), standards covering what are referred to as wideband CDMA (WCDMA), cdma2000 (such as cdma2000 1× or 3× air interface standards, for example) or TD-SCDMA.

The client station 14 may also be a computer that wirelessly access the Internet and/or that access the Internet through a landline.

Figure 2:
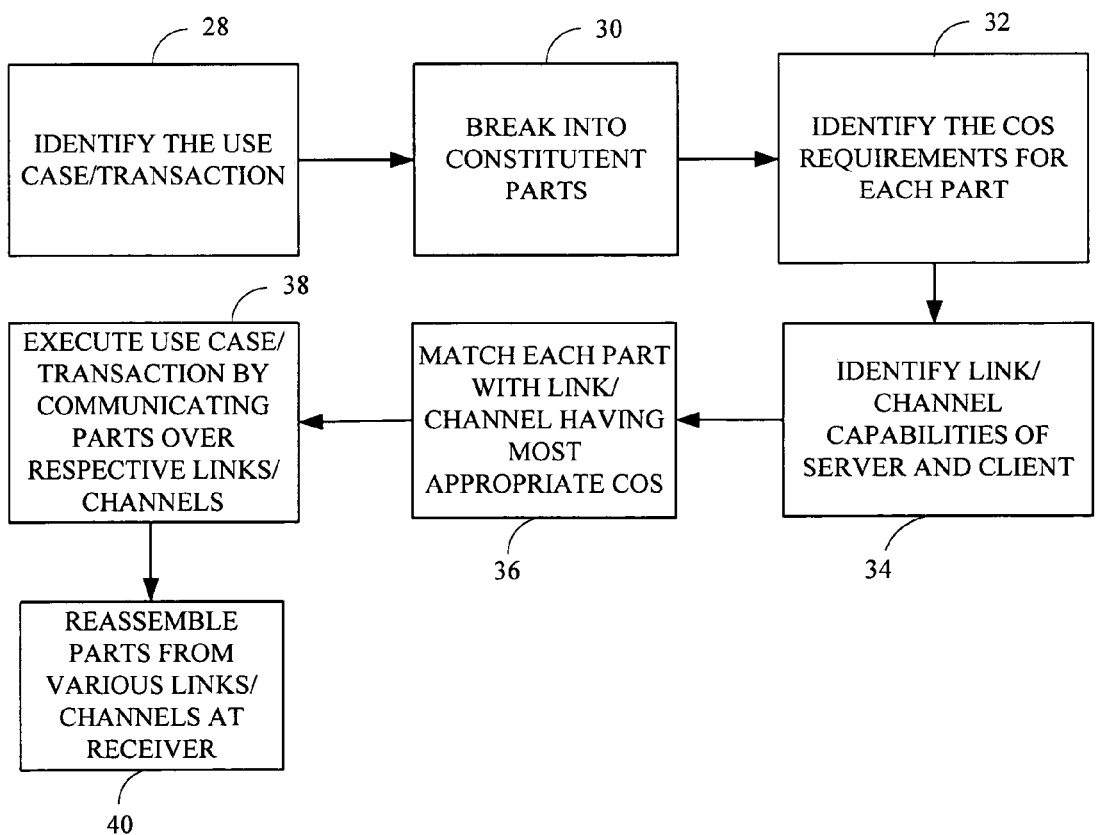
FIG. 2 is a flow chart of the process for breaking down use cases or transactions into their constituent parts based on COS requirements.

The process of the present invention can be appreciated in reference to FIG. 2, which can be undertaken using a computer. Commencing at block 28, the particular transaction or use case to be achieved is identified, and at block 30 it is partitioned into its constituent parts. For example, a use case might be broken down into its constituent transactions, which can be further partitioned into sub-parts.

Proceeding to block 32, the COS requirements of the various parts are identified. For instance, the bandwidth, latency, and error quality of each part might be determined. Then, moving to block 34, the communication capabilities of the server and client, along with the associated COS of each link/channel that might be used, is identified.

Once the COS requirements of the parts of a use case (or of a transaction) are identified and the available COS capabilities identified, the process moves to block 36. At block 36, the parts of the use case/transaction are matched with one of the available links, e.g., the links 24, 26 shown in FIG. 1, based on how well the COS capability of the link matches the COS requirements of the particular part.

At block 38 the use case/transaction is executed by partitioning the use case/transaction into its constituent parts at the transmitter and then communicating the parts over their respective links as determined at block 36. Then, at block 40 the parts are reassembled, i.e., are aggregated, from the various links/channels at the receiver.

The following non-limiting examples of specific implementations of the present invention are provided for illustration. In a first example, the client station 14 may be a personal computer or other user computer that has a high bandwidth, high latency GEO satellite link and a low bandwidth low latency terrestrial link. Absent the present invention, a client station wishing to participate in so-called "Massively Multi-player Online Games" will be unable to do so when using either of the available links exclusively, because the high latency of the satellite link renders unacceptable lag and the player is ejected from the game server, whereas the low bandwidth of the terrestrial link renders unacceptable queuing delay and again the user is ejected from the game server.

With the present invention, however, the low latency terrestrial link can be used to convey TCP acknowledgements and user originated game choices (move, attack, etc.), while the high bandwidth satellite link can be used to convey world state changes (perhaps in the forward direction only, with user acknowledgements flowing on the terrestrial link). That is, the COS requirements of the transactions that include TCP acknowledgements and user originated game choices can be matched to the COS capabilities of the terrestrial link, while the COS requirements of world status transactions can be matched to the COS capabilities of the satellite link. The game server can continue to serve the user with minimal visual lag for the user between games choices and their rendering on the client station. This example demonstrates a deployable API and Software Library making use of the methods and apparatus of this invention.

As another example, consider a client station 14 that is a mobile communication device that has, e.g., point-to-point wireless IS-95 CDMA capabilities, 802.11B capabilities, and broadcast VHF and/or UHF and/or SHF or EHF capabilities, preferably one-way but potentially two-way. That is, in this example three links are possible. Assume that it is desired that the mobile device facilitate rendering to a student of the service of an interactive multicast college lecture. The multimedia portion along with possible HTML/XML media can be originated from a communication node or server on the campus. The students, each having the exemplary device, can originate both audio and interactive question and answer HTML/XML media.

In this example, service establishment (having COS requirements that include relatively low latency and low bandwidth) can be initiated over either the IS-95 CDMA channel or 802.11B channel, since the COS capabilities of these links most nearly match the required COS. Service provisioning, on the other hand, requiring, as it does, relatively higher bandwidth but also tolerant of a bit higher latency, can best be matched to the COS capabilities of the VHF/UHF/SHF/EHF channel for multicast transmission of the multimedia portion and HTML/XML media originating from the campus node or server. Further, the IS-95 CDMA channel can be used for student audio (on a standby voice activated basis possibly) and the 802.11B channel can be used for TCP/IP transactions.

Note that although the multimedia portion is a best effort multicast, that is, you get it or you don't, the HTML/XML media is coat tailing on the multicast as quasi point-to-point use case. The server might expect independent acknowledgment from each student for the media transported, with unacknowledged media being re-multicast to be processed by those who have not yet received it. In the event of the loss or unavailability of the 802.11 or IS-95 CDMA channel, the remaining channel can stand in to support the full service commitment, possessing, as it does, the requisite COS capabilities.

As yet another example, consider a multi-mode mobile multimedia client station device with a terrestrial 1×Ev-DO link and a L/S/C band Low Earth Orbit (LEO) satellite link. The service provider can broadcast a multimedia base layer over the geographically broader LEO satellite downlink such that all devices within the geographic coverage of the LEO downlink can receive this layer and thus render a base quality of the broadcast media. However, clients desiring additional quality can receive enhancement layers of the multimedia stream over the terrestrial broadcast link. The service provider may choose to limit low count clients of a given cell when bandwidth resources are not available within that cell. The advantage of this use of multiple channels includes reduced bandwidth utilization by many base stations of the same multimedia material and therefore a greater availability of bandwidth for the enhancement layers.

In still another example, a high capacity channel can be used to deliver high bandwidth COS demand of the dictionary portion of a compression stream, while a lower capacity point-to-point, multicast, or broadcast channel may be used to carry the actual stream elements.

While the particular MULTI-CHANNEL COMMUNICATION SYSTEM AND METHOD BASED ON CLASS OF SERVICE REQUIREMENTS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. '112, sixth paragraph, unless the element is expressly recited using the phrase "means for" or, in the case of a method claim, the element is recited as a "step" instead of an "act".

What is claimed is:

1. A communication system, comprising:
   at least a first node; and
   at least a second node communicating with the first node pursuant to a single use case having at least first and second portions characterized by respective class of service (COS) requirements, wherein:
   the COS requirements include one or a combination of bandwidth requirements, latency requirements and error quality requirements,
   the nodes communicate with each other using assigned first and second protocols for the respective first and second portions, the first protocol having first COS capabilities and the second protocol having second COS capabilities different than the first COS capabilities,
   the first and second portions are assigned to the respective first and second protocols based at least in part on matching the characteristic COS requirements of the first and second portions to the COS capabilities of the first and second protocols, and
   the first and second portions are communicated using the assigned first and second protocols without further utilizing the characteristic COS requirements of the first and second portions after assignment to the respective first and second protocols.

2. The system of claim 1, wherein each node aggregates received portions.

3. The system of claim 1, wherein at least one protocol is bidirectional.

4. The system of claim 3, wherein both protocols are bidirectional.

5. The system of claim 1, wherein the first node is an online game server and the second node is a client station.

6. The system of claim 5, wherein the first protocol is a satellite link and the second protocol is a terrestrial link.

7. The system of claim 6, wherein the terrestrial link is used to communicate at least one of: TCP acknowledgements, and client-originated game choices, and the satellite link is used to communicate at least game world state changes from the server to the client station.

8. The system of claim 1, wherein the use case further includes at least a third portion characterized by respective COS requirements communicated over a respective third protocol having third COS capabilities different than the first and second COS capabilities.

9. The system of claim 8, wherein the second node is a mobile communication device, the first protocol is a point-to-point wireless communication link, the second protocol is a 802.11 link, and the third protocol is a wireless broadcast link.

10. The system of claim 9, wherein service between the first node and the wireless communication device is initiated over at least one of: the first and second protocol, and multimedia data is communicated from the first node pursuant to the service over the third protocol.

11. The system of claim 10, wherein at least audio data originating from a user of the wireless communication device is communicated to the first node using the first protocol, and TCP transactions are communicated using the second protocol.

12. The system of claim 9, wherein the point-to-point wireless communication link is a CDMA link and the wireless broadcast link is a VHF, UHF, SHF, or EHF link.

13. The system of claim 1, wherein the first node is a satellite, the first protocol is a satellite link, and the second protocol is a terrestrial link.

14. The system of claim 13, wherein the satellite is a low Earth orbit (LEO) satellite, the satellite link is at least one of: an L, S, or C band LEO link or a Ku, K, or Ka band LEG/MEG/GLO link, and the terrestrial link is a 1×Ev-DO link.

15. The system of claim 13, wherein the first portion is a base layer of a multimedia stream and the second portion is at least one enhancement layer of the multimedia stream.

16. A method for communication during a single use case between at least first and second nodes, the use case having at least first and second parts characterized by respective first and second class of service (COS) requirements, the method comprising:
    identifying at least first and second protocols available to the first and second nodes, the first and second protocols having respective first and second COS capabilities, the first COS capabilities being different than the second COS capabilities;
    assigning the first and second parts to the respective first and second protocols based at least in part on matching the characteristic COS requirements of the first and second parts to the COS capabilities of the first and second protocols;
    communicating the first and second parts using the assigned first and second protocols without further utilizing the characteristic COS requirements of the first and second parts after assignment of the respective first and second protocols; and
    wherein the COS requirements include one or a combination of bandwidth requirements, latency requirements and error quality requirements.

17. The method of claim 16, wherein each node aggregates received parts.

18. The method of claim 16, wherein at least one protocol is bidirectional.

19. The method of claim 18, wherein both protocols are bidirectional.

20. The method of claim 16, wherein the first node is an online game server and the second node is a client station.

21. The method of claim 20, wherein the first protocol is a satellite link and the second protocol is a terrestrial link.

22. The method of claim 21, wherein the terrestrial link is used to communicate at least one of: TCP acknowledgements, and client-originated game choices, and the satellite link is used to communicate at least game world state changes from the server to the client station.

23. The method of claim 16, wherein the use case further includes at least a third part characterized by respective COS requirements communicated over a respective third protocol having third COS capabilities different than the first and second COS capabilities.

24. The method of claim 23, wherein the second node is a mobile communication device, the first protocol is a point-to-point wireless communication link, the second protocol is a 802.11 link, and the third protocol is a wireless broadcast link.

25. The method of claim 24, wherein service between the first node and the wireless communication device is initiated over at least one of: the first and second protocol, and multimedia data is communicated from the first node pursuant to the service over the third protocol.

26. The method of claim 25, wherein at least audio data originating from a user of the wireless communication device is communicated to the first node using the first protocol, and TCP transactions are communicated using the second protocol.

27. The method of claim 24, wherein the point-to-point wireless communication link is a CDMA link and the wireless broadcast link is a VHF, UHF, SHF, or EHF link.

28. The method of claim 16, wherein the first node is a satellite, the first protocol is a satellite link, and the second protocol is a terrestrial link.

29. The method of claim 28, wherein the satellite is a low Earth orbit (LEO) satellite, the satellite link is at least one of: an L, S, or C band LEO link or a Ku, K, or Ka band LEG/MEG/GLO link, and the terrestrial link is a 1×Ev-DO link.

30. The method of claim 28, wherein the first part is a base layer of a multimedia stream and the second part is at least one enhancement layer of the multimedia stream.

31. A client station capable of communicating over at least two communication protocols, each with respective class of service (COS) capabilities, for communicating with at least a first node using both protocols incident to a single use case, comprising:
    at least one processor assigning at least first and second parts of the use case, each part being characterized by respective COS requirements different from each other, to the first and second protocols, for communicating the use case between the client station and the first node, based at least on matching the respective COS requirements of the first and second parts to the COS capabilities of the first and second protocols, wherein
    the first and second parts are communicated using the assigned first and second protocols without further utilizing the characteristic COS requirements of the first and second parts after assignment to the respective first and second protocols, and the COS requirements include one or a combination of bandwidth requirements, latency requirements and error quality requirements.

32. The client station of claim 31, wherein the processor aggregates parts received from the first node over the first and second links.

33. The client station of claim 31, wherein at least one protocol is bidirectional.

34. The client station of claim 33, wherein both protocols are bidirectional.

35. The client station of claim 31, wherein the first node is an online game server.

36. The client station of claim 35, wherein the first protocol is a satellite link and the second protocol is a terrestrial link.

37. The client station of claim 36, wherein the terrestrial link is used to communicate at least one of: TCP acknowledgements, and client-originated game choices, and the satellite link is used to communicate at least game world state changes from the server to the client station.

38. The client station of claim 31, wherein the use case further includes at least a third part characterized by respective COS requirements communicated over a respective third protocol having third COS capabilities different than the first and second COS capabilities.

39. The client station of claim 38, wherein the client station is a mobile communication device, the first protocol is a point-to-point wireless communication link, the second protocol is a 802.11 link, and the third protocol is a wireless broadcast link.

40. The client station of claim 39, wherein service between the first node and the client station is initiated over at least one of: the first and second protocol, and multimedia data is communicated from the first node pursuant to the service over the third protocol.

41. The client station of claim 40, wherein at least audio data originating from a user of the client station is communicated to the first node using the first protocol, and TCP transactions are communicated using the second protocol.

42. The client station of claim 39, wherein the point-to-point wireless communication link is a CDMA link and the wireless broadcast link is a VHF, UHF, SHF, or EHF link.

43. The client station of claim 31, wherein the first node is a satellite, the first protocol is a satellite link, and the second protocol is a terrestrial link.

44. The client station of claim 43, wherein the satellite is a low Earth orbit (LEO) satellite, the satellite link is at least one of: an L, S, or C band LEO link or a Ku, K, or Ka band LEG/MEG/GLO link, and the terrestrial link is a 1×Ev-DO link.

45. The client station of claim 43, wherein the first part is a base layer of a multimedia stream and the second part is at least one enhancement layer of the multimedia stream.

46. A system for communication during a single use case between at least first and second nodes, the use case having at least first and second parts characterized by respective first and second class of service (COS) requirements, comprising:

means for identifying at least first and second protocols available to the first and second nodes, the first and second protocols having respective first and second COS capabilities, the first COS capabilities being different than the second COS capabilities;

means for assigning the first and second parts to the respective first and second protocols based at least in part on matching the characteristic COS requirements of the first and second parts to the COS capabilities of the first and second protocols;

means communicating the first and second parts using the assigned first and second protocols without further utilizing the characteristic COS requirements of the first and second parts after assignment of the respective first and second protocols; and wherein the COS requirements include one or a combination of bandwidth requirements, latency requirements and error quality requirements.

47. The apparatus of claim 46, wherein the use case further includes at least a third part characterized by respective COS requirements communicated over a respective third protocol having third COS capabilities different than the first and second COS capabilities.

48. The apparatus of claim 47, wherein the second node is a mobile communication device, the first protocol is a point-to-point wireless communication link, the second protocol is a 802.11 link, and the third protocol is a wireless broadcast link.

49. The apparatus of claim 48, wherein service between the first node and the wireless communication device is initiated over at least one of: the first and second protocol, and multimedia data is communicated from the first node pursuant to the service over the third protocol.

50. The apparatus of claim 48, wherein the point-to-point wireless communication link is a CDMA link and the wireless broadcast link is a VHF, UHF, SHF, or EHF link.

51. The apparatus of claim 46, wherein the first node is a satellite, the first protocol is a satellite link, and the second protocol is a terrestrial link.

* * * * *